United States Patent [19]

Bekkers

[11] Patent Number: 5,141,471
[45] Date of Patent: Aug. 25, 1992

[54] DEVICE FOR SEVERING THE PUBIS OF THE CARCASS OF A SLAUGHTERED ANIMAL

[75] Inventor: Marinus F. L. Bekkers, Son en Breugel, Netherlands

[73] Assignee: C.C.M. Beheer B.V., Nuenen, Netherlands

[21] Appl. No.: 702,040

[22] Filed: May 17, 1991

[30] Foreign Application Priority Data

May 17, 1990 [NL] Netherlands .................. 9001153

[51] Int. Cl.⁵ .............................................. A22B 5/20
[52] U.S. Cl. .................................... 452/122; 452/160; 452/163
[58] Field of Search ............... 452/160, 122, 109, 120, 452/149, 163

[56] References Cited

U.S. PATENT DOCUMENTS

| 3,958,302 | 5/1976 | Meyn | 452/120 |
| 4,087,886 | 5/1978 | Aubert | 452/122 |
| 4,507,822 | 4/1985 | Herubel | 452/160 |
| 4,779,307 | 10/1988 | Van Der Hoorn et al. | 452/163 |
| 5,062,820 | 11/1991 | Rankin et al. | 452/160 |

Primary Examiner—Willis Little
Attorney, Agent, or Firm—Fiddler & Levine

[57] ABSTRACT

Device for severing the pubis of the carcass of a slaughtered animal, comprising a positioning element, a rotary-driven cylindrical first cutting element, and a blade-type cutting element, which are combined into a functional unit which can be moved as a whole to and from the carcass, and a pressure element which is situated next to the cylindrical cutter, at the end of a guided carrier movable parallel to the direction of movement of said cutter, which pressure element has a U-shaped pressure stirrup for gripping around the tail and pressing it down.

7 Claims, 6 Drawing Sheets

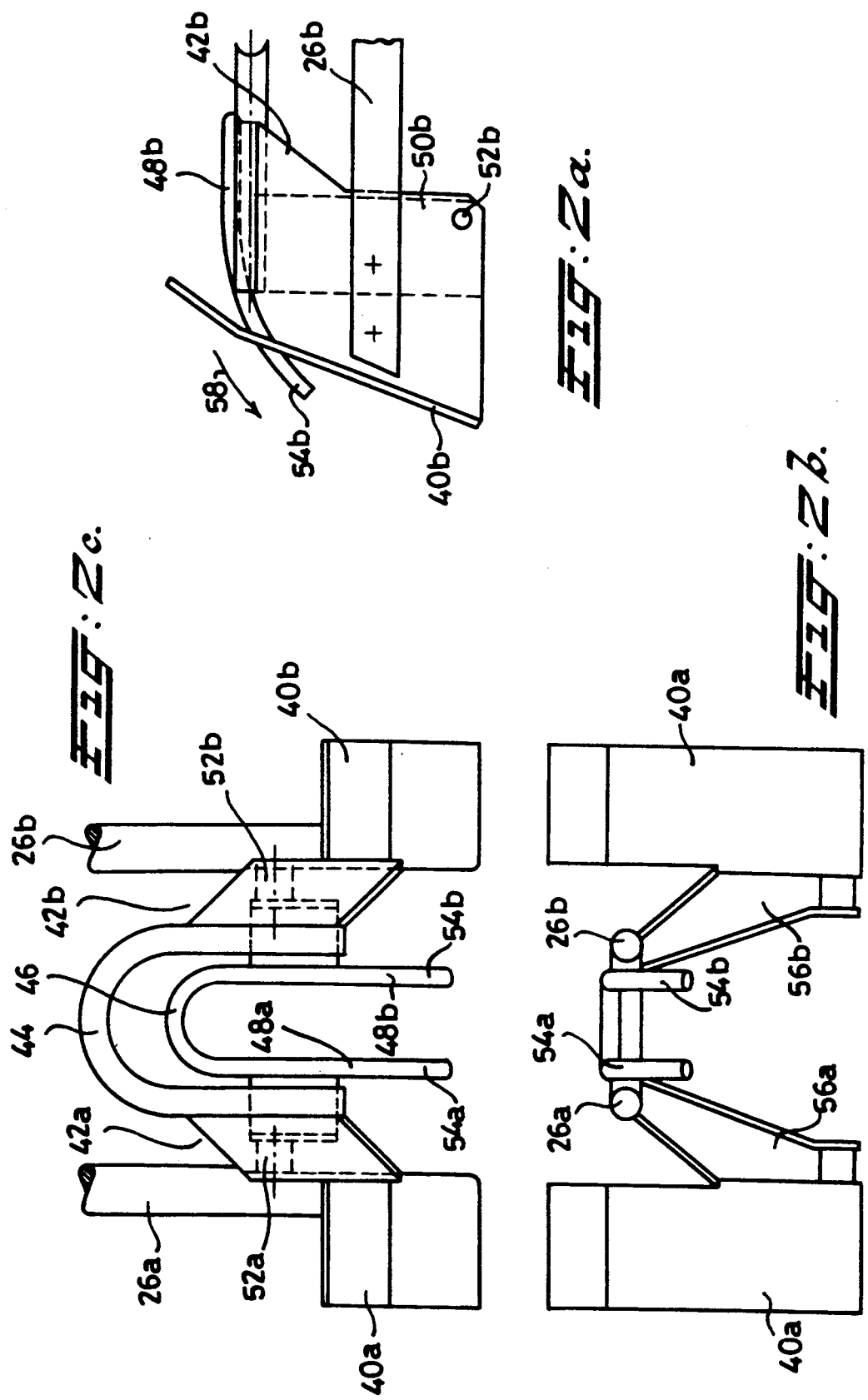

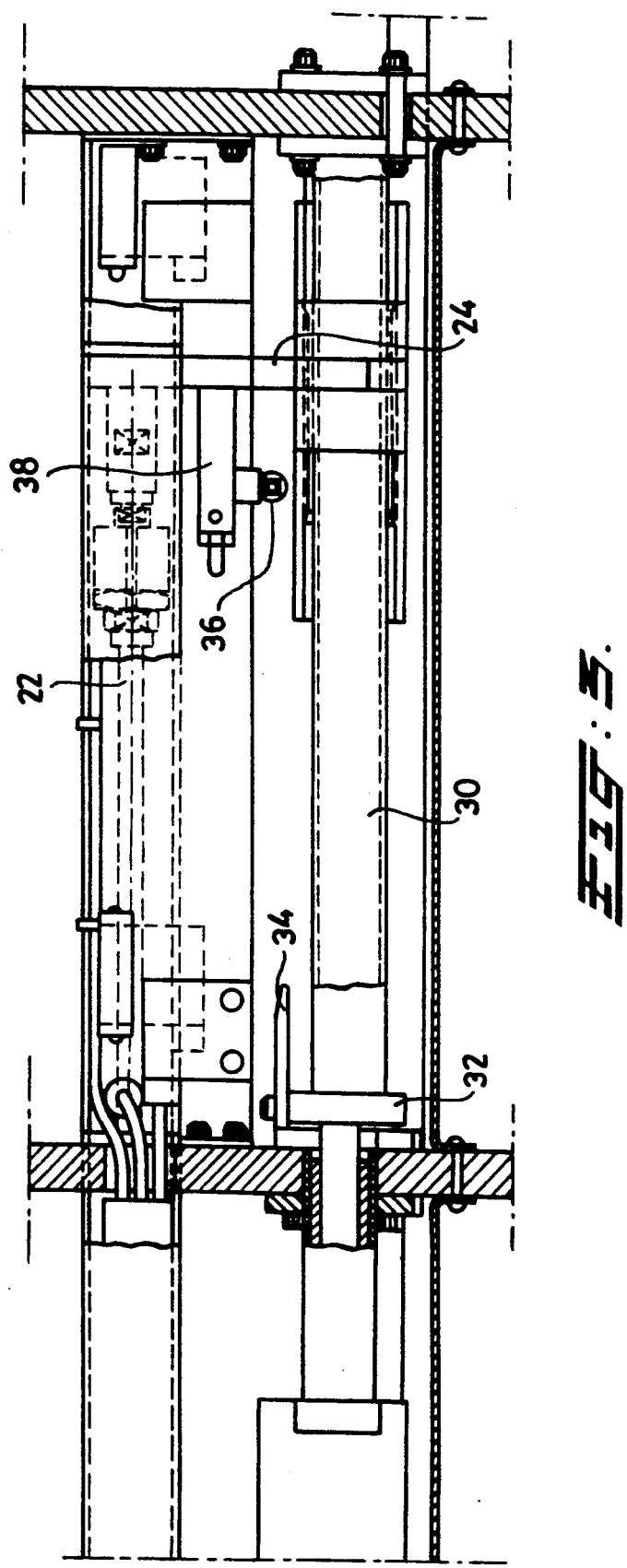

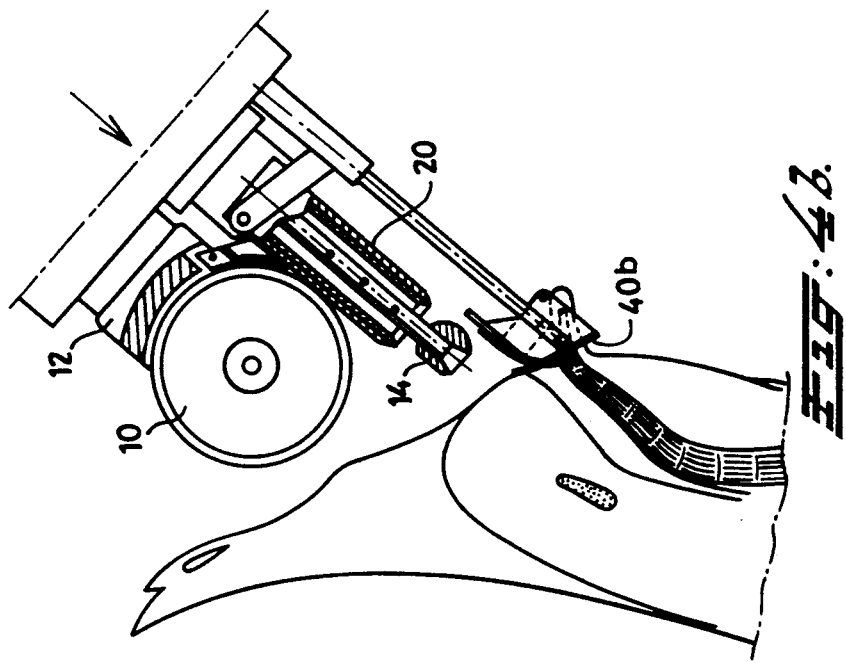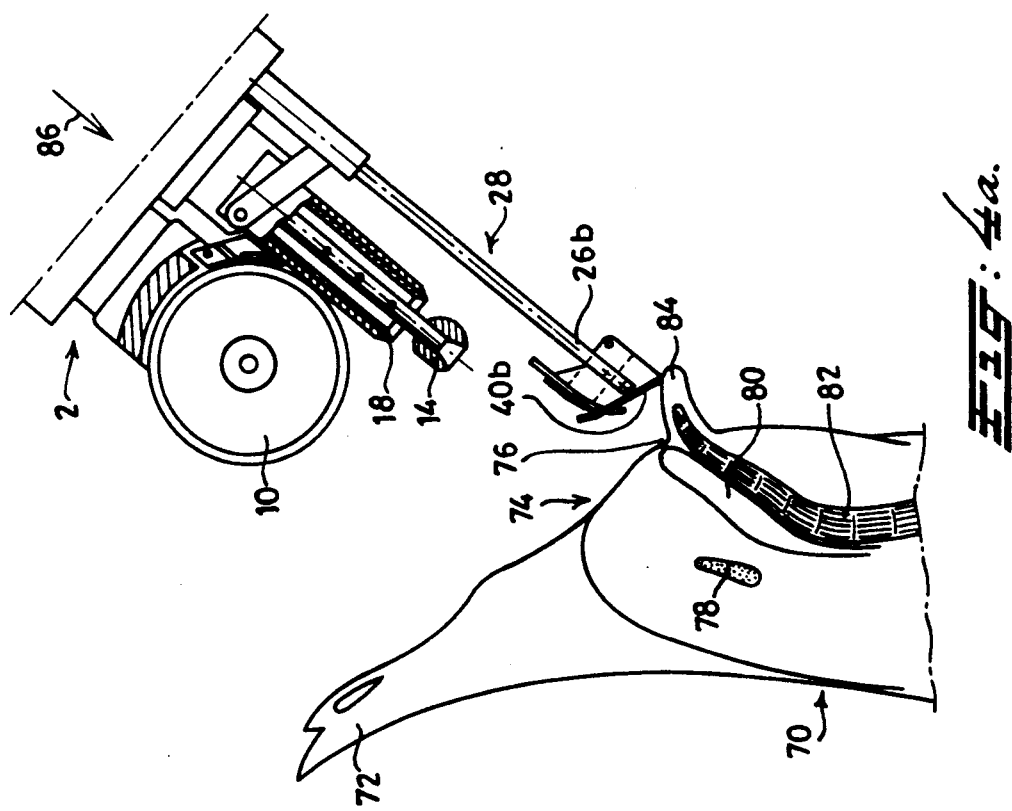

DEVICE FOR SEVERING THE PUBIS OF THE CARCASS OF A SLAUGHTERED ANIMAL

BACKGROUND OF THE INVENTION

The invention relates to a device for severing the pubis of the carcass of a slaughtered animal, in particular a pig, comprising a positioning element which is fitted at the end of an elongated carrier and is to be introduced through the anus into the rectum, a rotary-driven cylindrical first cutting element which is fitted concentrically around it and is displaceable in the lengthwise direction, and which has an end cutting edge describing a circular movement for cutting loose the rectum, and a blade-type cutting element for severing the pubis, which are combined to a functional unit which can be moved in its entirety to and from the carcass, and in which the movements of the positioning element can be controlled independently of those of the other elements.

DESCRIPTION OF THE PRIOR ART

Such a device is known per se from NL-A-8602219 (corresponding to EP-A-0,258,939).

Although this known device operates satisfactorily in practice, sometimes the problem is encountered that the position of the tail of the carcass is not precisely defined while the operation is being carried out and also that the depth over which the cylindrical cutter penetrates into the carcass depends on the position of the carcass relative to the device and is sometimes too great, which leads to damage to the rectum with the escape of faeces.

SUMMARY OF THE INVENTION

The object of the invention is to eliminate these problems, and this object is achieved according to the invention by a pressure element which is situated next to the cylindrical cutter, at the end of a guided carrier movable parallel to the direction of movement of said cutter, which pressure element has a U-shaped pressure stirrup for gripping around the tail and pressing it down.

Preferably this pressure stirrup is accommodated inside a carrying stirrup about an axis of rotation which is situated at right angles to the longitudinal axis of the carrier, is provided with end edges flanged downwards, and is springtensioned away from the carrier.

In a preferred embodiment two pressure plates are fitted on the carrier, enclosing the pressure stirrup between them and situated at right angles to the direction of movement thereof.

Preferably fitted on the elongated carrier which is guided in the lengthwise direction inside the functional unit is a first element which moves along with the part of said carrier lying inside the unit and indicates the position thereof relative to the unit, and which forms a reference limiting the stroke of the positioning element relative to the unit.

DESCRIPTION OF THE DRAWINGS

FIG. 2a is a side view of the stirrup used according to the invention, with tail displacer and pressure plates;

FIG. 2b is a front view of these elements;

FIG. 2c is a top view of these elements;

FIG. 3 is a schematic cross-section of a part of the functional unit to illustrate the control achieved with carrier and pressure plates.

DESCRIPTION OF A PREFERRED EMBODIMENT

Figure 1:
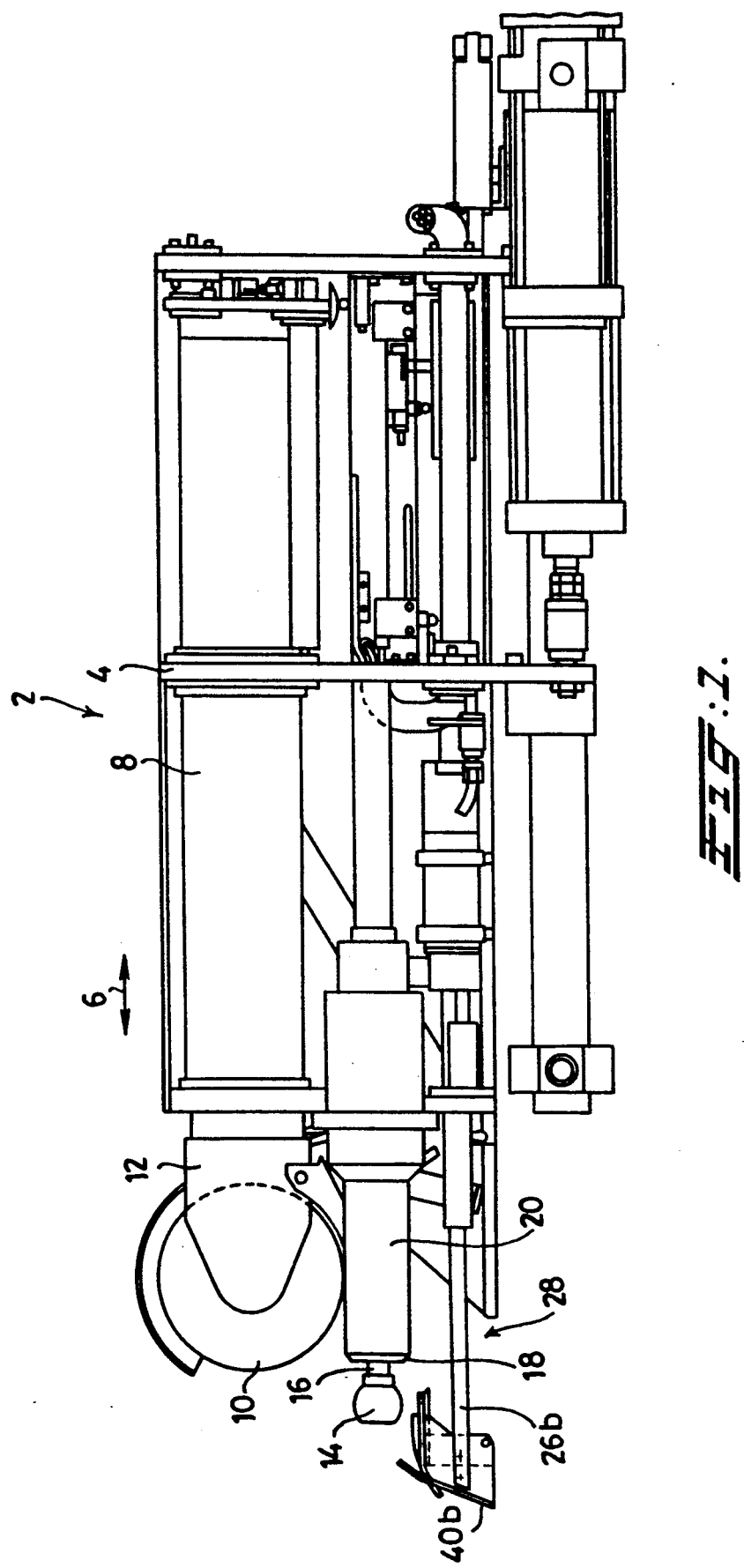
FIG. 1 is a side view of the functional cutting unit as known from NL-A-8602219.

The functional unit 2, which is the subject of an apparatus such as that described in NL-A-8602219, comprises a frame 4 in which a rotary-driven, blade-type cutter 10, accommodated in a housing 12, is supported so that it moves in the direction of the arrows 6 under the influence of a working cylinder 8. Below this cutter is a spherical positioning and shut-off element 14 which is to be introduced into the rectum of the carcass, and which is fitted on the end of the elongated carrier 16 and can also be moved in the direction of the arrows 6, independently of the movement of the cutter 10. Placed concentrically around the carrier 16 is a cylindrical cutter 18, which is accommodated in a protective sleeve 20; cutter and sleeve are fixed to the frame 4 and thus move along with it. The movement of the carrying rod 16 is transmitted to the rod 22 which lies in line with it (see FIG. 3) and which bears at the rear end a stop 24 which is positioned at right angles to said rod, and the function of which will be explained in greater detail below.

The movement of the carrying rod 16, and thus of the rod 22, is brought about by means of a suitable control by an air cylinder (not shown).

Up to this point the device according to the invention corresponds by and large to the one which is known from NL-A-8602219. A major difference from this known device is, however, the presence of a carrier 28 which is mounted in the frame 4 so that it is slidable in the direction of the arrows 6 and which comprises two rods 26a, 26b which are connected to a rod 30 which is guided in the frame on the righthand side and thus follows the movements of the carrier 28. This rod 30 bears two stops: a first, indicated by 32 and interacting with the stop 24 on the rod 22, and a second, indicated by 34 and forming a run-on cam. This run-on cam 34 interacts with the control roller 36 of a switch 38 which is connected to the carrying rod 16 of the positioning element 14 and, if operated, stops the movement thereof. The object of the two stops and the way in which they work will now be explained in further detail below.

As FIGS. 2a, 2b and 2c show, the carrying rods 26a, 26b each bear on their front end a pressure plate 40a, 40b, which—as will be explained below—in the end come to rest against the carcass on either side of the anus when the cutting unit is moved towards the carcass. They also carry by means of the connecting plates 42a, 42b a U-shaped stirrup 44 in which a second U-shaped stirrup 46 is accommodated, the legs 48a, 48b of which are connected to the bearing plates 42a, 42b by means of connection plates 50a, 50b so that they pivot about axes 52a, 52b. The front ends 54a, 54b of the legs 48a, 48b are bent downwards and two tension springs 56a, 56b pull the stirrup 46 in the direction of the arrow 58.

The device largely works in the same way as the known device, although as a result of the presence of the displaceable tail pressure stirrup 46 and the control functions performed by its carrier there are differences. The way in which it works is explained with reference to FIGS. 4a to 4f.

Figure 4A:
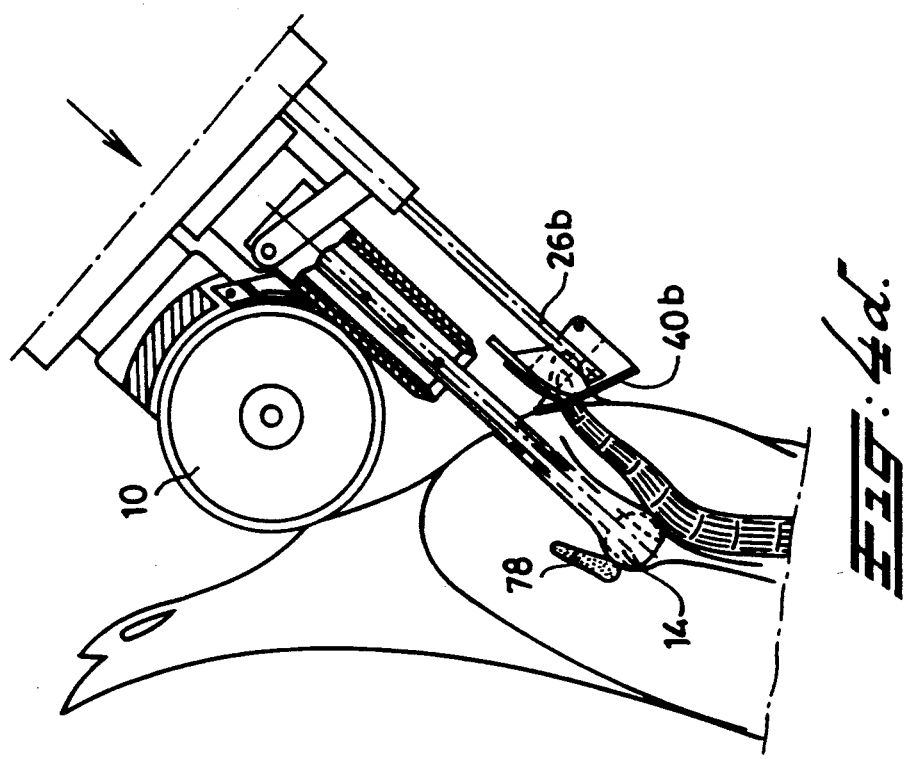
Figure 4C:
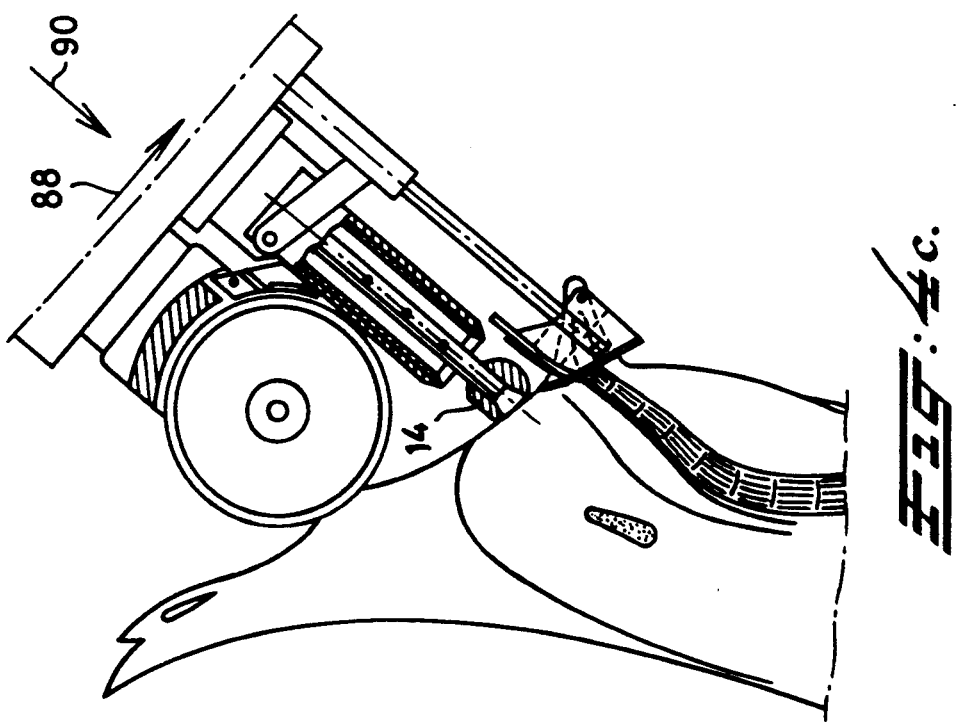
Figure 4F:
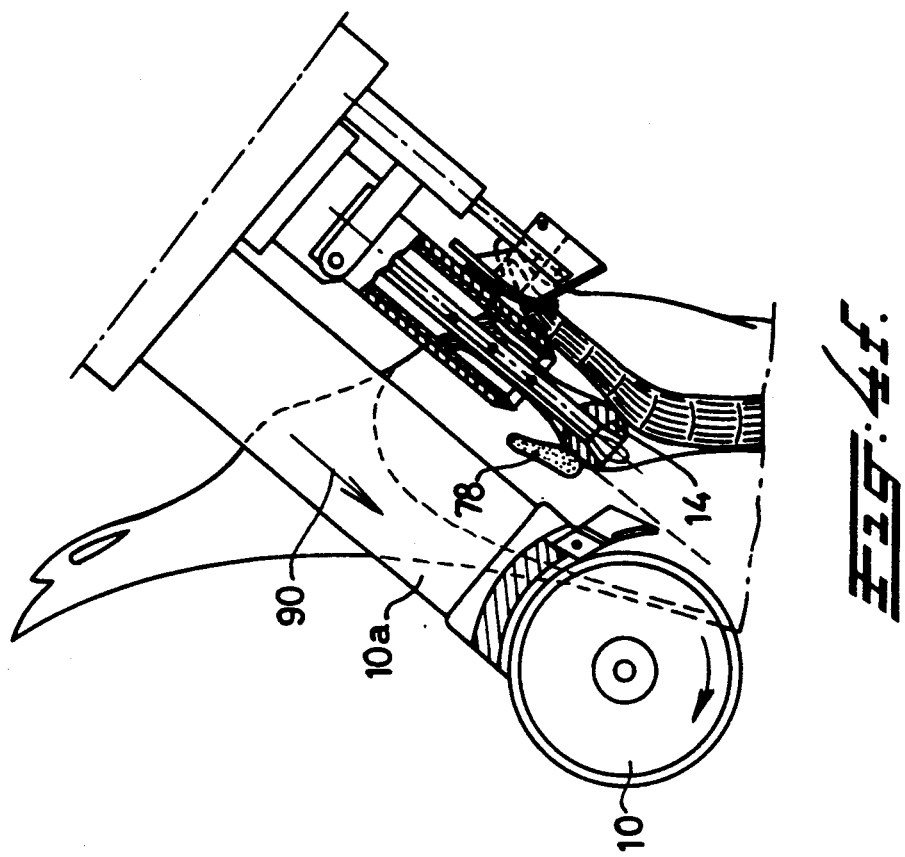
Figure 4E:
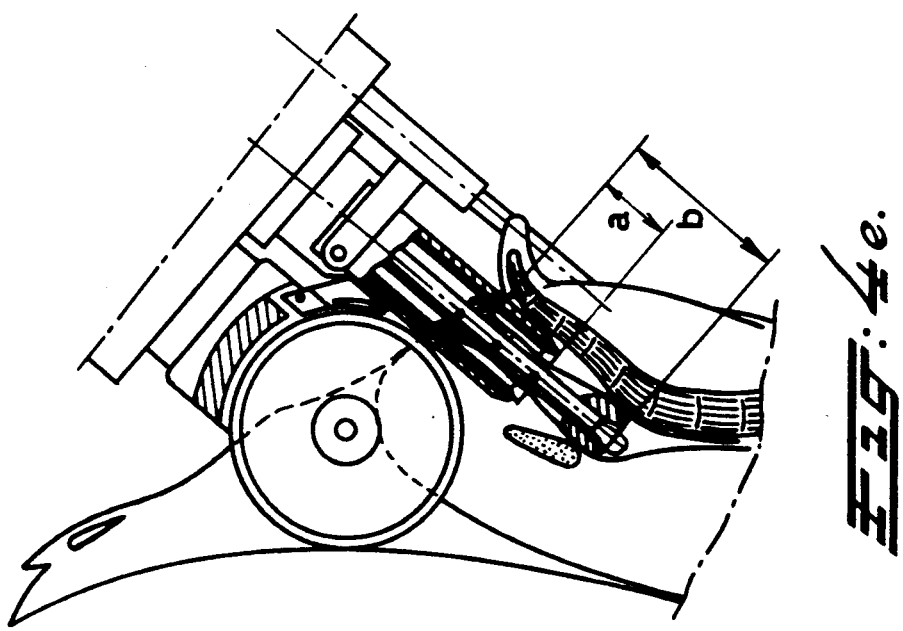

These figures show a pig carcass 70, suspended by the hind legs 72, with the flank 74, anus 76, rectum 80, backbone 82 and tail 84. FIG. 4a shows the situation in which the functional unit 2 is being moved in the direction of the arrow 86 towards the carcass. FIG. 4b shows how this movement is stopped when the unit 2 is a certain distance from the carcass and has reached the position shown; the pressure plates 40a, 40b then lie against the carcass, and the stirrup 46 takes the tail into a fixed, downward-pointing position, so that the tail cannot impede the remaining operations. Through a movement in the direction of the arrows 88 and 90, indicated in FIG. 4c, the positioning and shutoff ball 14 seeks the anus and when it has found it penetrates—driven by an air cylinder which is not shown through the rectum until it reaches the position shown in FIG. 4d. The distance over which the ball 14 penetrates into the rectum is determined by the distance which the carrier 28 has been pushed back into the unit; the stop 32 (FIG. 3) in this case moves to the right, while the stop 34 connected to the carrying rod 16 moves to the left during the movement of the positioning ball until the stop 24 runs up against the stop 32. This stroke of the positioning ball 14 is shown by 'b' in FIG. 4e. Finally, the whole unit (see FIG. 4e) with the rotary-driven cylindrical cutter 18 and the rotary-driven blade cutter 10 moves forward over a distance which is indicated by 'a' in FIG. 4e and is also determined by the distance over which the carrier 28 is pushed back into the unit. For, with this carrier the stopping cam 34 also moves to the right; this stopping cam interacts, as already explained, with the feeler 36 which moves along with the unit to the left and is connected to a switch (not shown) which when the feeler 36 runs up against the projection 34 stops the movement of the unit, which has then reached the position shown in FIG. 4e. Finally, the cutting blade 10 with its carrier 10a moves forward in the direction of the arrow 90, and in the process cleaves the pubis 78.

The different component parts are then returned to their initial position.

What is claimed is:

1. Device for severing the pubis of the carcass of a slaughtered animal, in particular a pig, comprising a positioning element which is fitted at the end of an elongated carrier and is to be introduced through the anus into the rectum, a rotary-driven cylindrical first cutting element which is fitted concentrically around it and is displaceable in the lengthwise direction, and which has an end cutting edge describing a circular movement for cutting loose the rectum, and a blade-type cutting element for severing the pubis, which are combined into a functional unit which can be moved as a whole to and from the carcass, and in which the movements of the positioning element can be controlled independently of those of the other elements, comprising a pressure element which is situated next to the cylindrical cutter, at the end of a guided carrier movable parallel to the direction of movement of said cutter, which pressure element has a U-shaped pressure stirrup for gripping around the tail and pressing it down.

2. Device according to claim 1, in which the pressure stirrup is accommodated inside a carrying stirrup about an axis of rotation which is situated at right angles to the longitudinal axis of the carrier, is provided with end edges flanged downwards, and is springtensioned away from the carrier.

3. Device according to claim 1, in which two pressure plates are fitted on the carrier, enclosing the pressure stirrup between them and situated at right angles to the direction of movement thereof.

4. Device according to claim 1, in which fitted on the elongated carrier which is guided in the lengthwise direction inside the functional unit is a first element which moves along with the part of said carrier lying inside the unit and indicates the position thereof relative to the unit, and which forms a reference limiting the stroke of the positioning element relative to the unit.

5. Device according to claim 1, in which the first element is a stop which interacts with a second stop coupled to the positioning element carrier and running up against it.

6. Device according to claim 1, in which fitted on the elongated carrier which is guided in the lengthwise direction inside the functional unit is a second element which moves along with the part of said carrier lying inside the unit and indicates the position thereof relative to the unit, and which forms a reference limiting the stroke of the functional unit.

7. Device according to claim 6, in which the second element is formed by a run-up roller fixed on the carrier, interacting with a switch fixed on the unit and operated by a run-up roller.

* * * * *